Sept. 2, 1969   E. G. KRICKOVICH   3,464,128
SNOW REMOVER WITH MELTING MEANS
Filed Aug. 10, 1967   2 Sheets-Sheet 1

Eli G Krickovich
INVENTOR.

Sept. 2, 1969  E. G. KRICKOVICH  3,464,128
SNOW REMOVER WITH MELTING MEANS
Filed Aug. 10, 1967  2 Sheets-Sheet 2
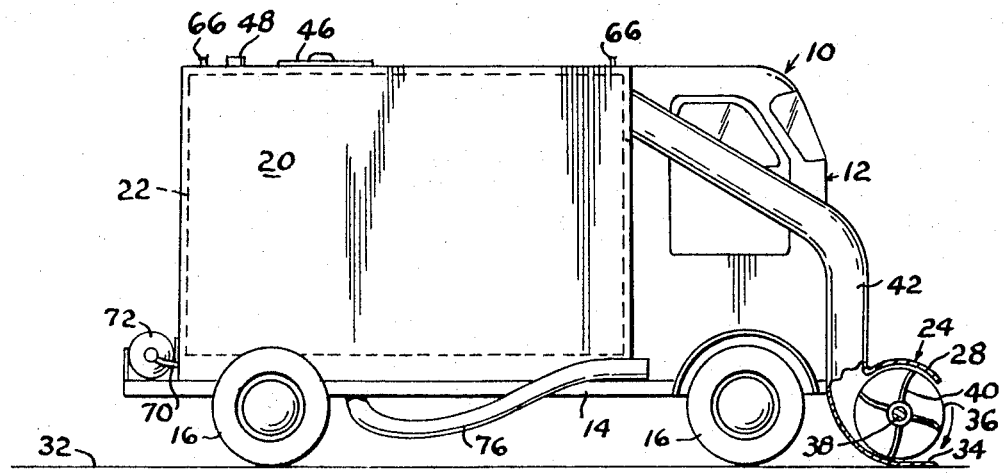
FIG. 2
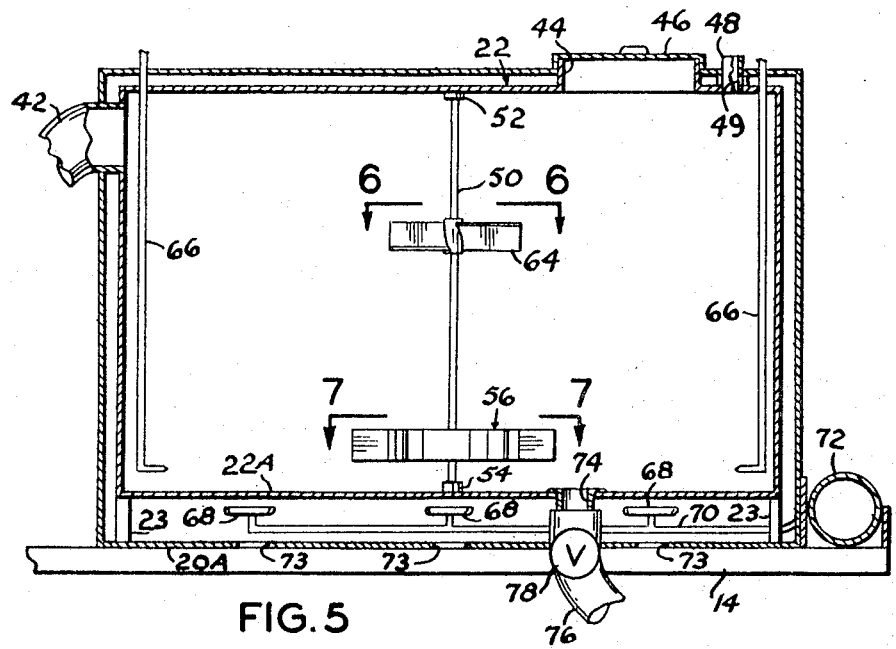
FIG. 5
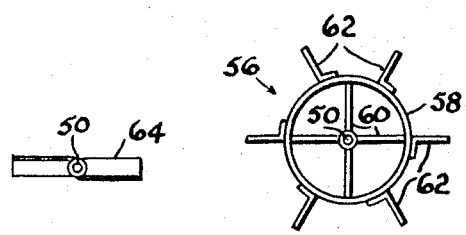
FIG. 6   FIG. 7
INVENTOR.

United States Patent Office 3,464,128
Patented Sept. 2, 1969

3,464,128
SNOW REMOVER WITH MELTING MEANS
Eli G. Krickovich, R.F.D., De Witt, Iowa 52742
Filed Aug. 10, 1967, Ser. No. 664,592
Int. Cl. E01h 5/10; F24h 1/00
U.S. Cl. 37—12                                                    1 Claim

ABSTRACT OF THE DISCLOSURE

A substantially hollow tank is mounted on a truck chassis having an engine and a control cab. A snowplow is transversely mounted across the lower front end portion of the truck chassis and connected with the tank by a tube. Burners below the tank melt snow placed therein. Agitators within the tank insure complete melting of the snow which is exhausted as water through a drain.

BACKGROUND OF THE INVENTION

In the removal of snow from streets and roadways as a result of snow storms it is present practice, generally, to employ a snowplow or in some instances graders which move the snow off the street into piles or rows which later must be picked up by a loader and deposited in dump trucks; the dump trucks placing the snow in selected areas to remain until warm weather melts the snow. This type of operation is time consuming and expensive in man hours and necessary equipment and, furthermore, is a comparatively slow process of snow removal.

This invention simplifies the above steps of removing snow by providing a single machine which picks up the snow and melts it in a container which is drained into a storm sewer, or the like, thus saving time and wear of equipment by disposing of the snow as it is removed from the roadway.

A further important object of this invention is it permits traffic to flow through a city with little or no hindrance as snow is picked up rapidly for temporary storage in a large storage tank for melting, and later, this resultant water may be discharged in an area off the roadway.

Another important advantage of this invention is it can be manufactured in different sizes, according to need, for removing snow from streets, walks, landing fields for airplanes, and the like.

SUMMARY OF THE INVENTION

A hollow tank is placed within a surrounding frame mounted on a truck chassis rearwardly of its engine and control cab. A snowplow including a screw and impeller or blower is transversely mounted across the lower front end portion of the truck chassis and connected with the tank by a tube. Burners, mounted under the tank and connected with a source of fuel, heat the tank for melting contained snow while snow agitator means within the tank churns the snow and water to insure complete melting of the snow. The resultant water is periodically drained into a storm sewer, or the like.

The principal object of this invention is to provide a snow remover which is mounted on a vehicle chassis for removing, storing and melting snow which is later drained off as water.

BRIEF DESCRIPTION OF THE DRAWINGS

FIGURE 2 is a right side elevational view;
FIGURE 5 is a vertical cross-sectional view, to a larger scale, taken substantially along the lines 5—5 of FIG. 3; and, FIGURES 6 and 7 are horizontal cross-sectional views taken substantially along the lines 6—6 and 7—7, respectively, of FIG. 5.

DESCRIPTION OF THE PREFERRED EMBODIMENT

Figure 1:
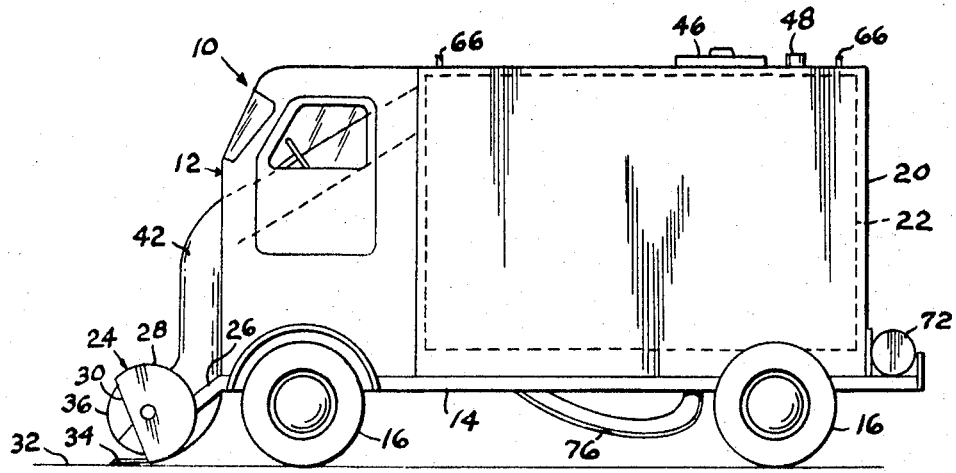
FIGURE 1 is a left side elevational view of the snow remover.
Figure 3:
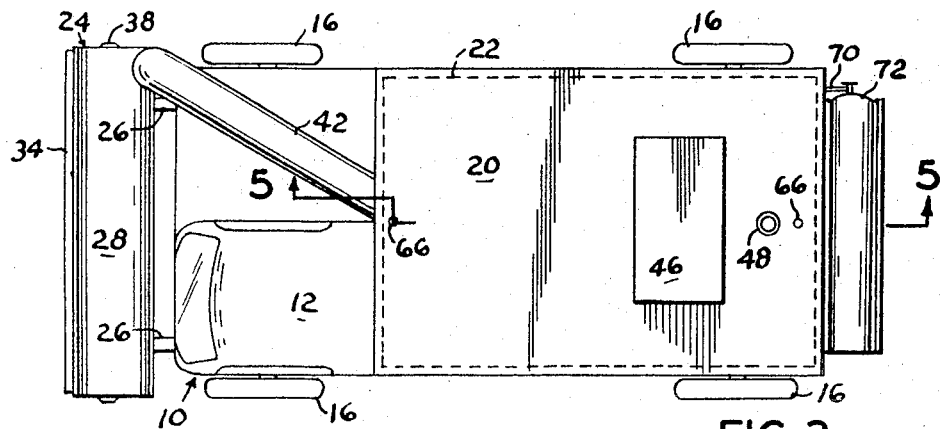
FIGURE 3 is a top view of FIG. 1.
Figure 4:
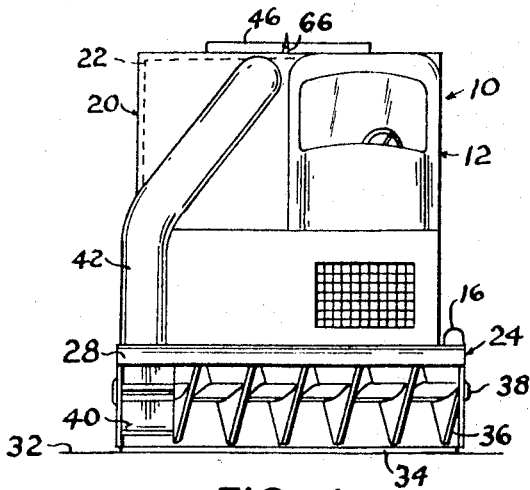
FIGURE 4 is a front end elevational view.

Like characters of reference designate like parts in those figures of the drawings in which they occur.

In the drawings:

The reference numeral 10 indicates a substantially conventional truck chassis having an engine and a control cab 12 mounted on vehicle frame members 14 and supported by wheels 16. A rectangular hollow frame 20 is mounted on the vehicle frame members 14 rearwardly of the cab 12. A similarly shaped tank 22, of slightly smaller dimensions, is positioned within the frame 20 in inwardly spaced relation with respect to the surrounding frame walls. The bottom wall 22A of the tank 22 is supported a selected distance above the bottom wall 20A of the frame 20 by legs 23. The frame 20 and tank 22 are shown rectangular but may be of any desired overall configuration such as ovate or cylindrical, not shown. The spacing between the tank 22 and frame 20 is to provide insulating qualities for the tank 22 and for other purposes presently apparent.

A snowplow, indicated as 24, is mounted transversely of the vehicle chassis adjacent the lower forward end portion thereof by brace members 26 which connect the plow 24 to the chassis frame members 14. The snowplow 24 comprises a substantially cylindrical outer jacket 28 having closed ends defining a longitudinally extending forwardly open side. The open side of the jacket 28 subtends an arc of its periphery, as indicated by the forward edge 30 of one closed end. A portion of the longitudinal wall of the jacket 28 is turned downwardly substantially parallel with the surface of the earth or roadway, indicated at 32, to form a lip or scoop 34 for picking up snow as the device is moved forwardly. The snowplow further includes a screw conveyor 36 mounted on a horizontal shaft 38 which is journalled at its respective ends by the respective ends of the jacket 28. A substantially fan-type impeller or blower 40 is mounted on the shaft 36 within and at one end portion of the jacket 28. A relatively large sized tube 42 is connected, at one end, with the jacket rearward and upwardly of the blower 40 and extends upwardly toward and is connected, at its other end portion, to the upper forward surface of the tank 22 through the frame 20. Both the screw 36 and blower 40 are power driven by any suitable conventioinal means, such as belts and pulleys powered by the vehicle engine, neither of which is shown.

Referring more particularly to FIG. 5, the tank 22 is provided with an opening 44 in its upper surface which is normally covered by an access lid 46. A vent 48, in the upper surface of the tank 22 communicating with the spacing between the tank 22 and frame 20, as at 49, provides communication with the atmosphere. A vertical shaft 50, journalled by bearings 52 and 54 centrally secured to the respective top and bottom walls of the tank 22, is provided adjacent its depending end with a coaxially connected paddle type first agitator 56. The agitator 56 comprises a wheel-like ring 58 (FIG. 7) connected by spokes 60 to the shaft 50 for rotation therewith. A plurality of square or rectangular fins 62 are connected with and project radially outward of the periphery of the ring 58 for the purposes of agitating and mixing snow with the water of melted snow. A propeller-like second agitator 64 is similarly mounted on the shaft 50 in spaced relation above the agitator 56. The agitator shaft 50 is similarly power driven by belts and pulleys from the vehicle engine or its driveshaft, not shown, for rotation of the agitator shaft about its longitudinal axis.

One or more air lines 66 extends vertically into the tank 22 inwardly of its end walls and terminate in spaced relation with respect to the bottom wall 22A for exhausting air, supplied by the vehicle air brake reservoir, not shown, into the contained snow and water to insure mixing and melting of the snow. A plurality of burners 68, disposed below the tank bottom wall 22A, is connected by a gas line 70 with a source of fuel, such as bottled gas indicated by the cylinder 72 mounted on the chassis frame 14 rearwardly of the frame 20, to heat the bottom surface area of the tank 22 for melting the snow. Suitable openings 73 are formed in the bottom wall of the frame 20 to admit air and support combustion of the fuel. An opening 74 is formed in the bottom wall 22A of the tank which communicates with a drain tube or the line 76 extending through the bottom wall of the frame 20. A valve 78 is interposed in the drain line 76 for draining water accumulating in the tank 22.

OPERATION

In operation the device is moved forwardly over the snow-coverd roadway 32 wherein the scoop 34 directs snow upwardly toward the screw 36 which conveys the snow to the blower 40 which picks up and blows the snow through the tube 42 into the tank 22. The burners, operating to heat the bottom surface of the tank 22, converts the snow to water while an excess of snow piling up within the tank 22, is agitated and mixed with the melting snow by the agitators 56 and 64 or air lines 66. The vent 48 prevents accumulation of pressure within the tank 22 and vents burned gases. Periodically the accumulated water is removed from the tank by opening the drain valve 78.

I claim:

1. A snow remover in combination with a vehicle chassis having a control cab thereon, the improvement, comprising: a snowplow transversely connected to the forward end of said chassis, said snowplow comprising, a substantially cylindrical jacket having a forwardly open side and closed ends, a shaft journalled horizontally by the closed ends, a screw conveyor journalled by said shaft, and a blower mounted on said shaft at one end of said conveyer; tank means mounted on said chassis rearwardly of said cab, said tank means comprising, an outer frame, a tank within said outer frame in spaced relation with respect to the walls thereof, and burner means within said outer frame for heating said tank means; a tube interconnecting said snowplow with said tank means; and agitating means within said tank, said agitating means comprising a vertical rotating shaft, a wheel-like ring having spokes horizontally connected with said vertical rotating shaft intermediate its ends, and a plurality of fins connected with and projecting radially outward of said ring for mixing snow and water contained by said tank means.

References Cited

UNITED STATES PATENTS

| | | | |
|---|---|---|---|
| 969,716 | 9/1910 | Muller et al. | 37—12 |
| 980,564 | 1/1911 | Riordan | 37—12 |
| 1,051,969 | 2/1913 | Riordan | 37—12 |
| 2,738,786 | 3/1956 | Leary | 37—12 |
| 2,893,377 | 7/1959 | Janousek | 37—12 |
| 3,011,493 | 12/1961 | Zieba. | |
| 3,036,391 | 5/1962 | Kemp | 37—12 |
| 3,309,798 | 3/1967 | Devlin et al. | 37—12 |
| 3,333,354 | 8/1967 | Kirshenblat | 37—12 |
| 3,393,462 | 7/1968 | Picker | 37—12 |

ROBERT E. PULFREY, Primary Examiner

EUGENE H. EICKHOLT, Assistant Examiner

U.S. Cl. X.R.

126—343.5